United States Patent
Ito et al.

(10) Patent No.: US 7,592,856 B2
(45) Date of Patent: Sep. 22, 2009

(54) CHARGE PUMP CIRCUIT DRIVER CIRCUIT HAVING A PLURALITY OF OSCILLATORS

(75) Inventors: Tomoyuki Ito, Kyoto (JP); Isao Yamamoto, Kyoto (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 11/792,178

(22) PCT Filed: Nov. 18, 2005

(86) PCT No.: PCT/JP2005/021242

§ 371 (c)(1),
(2), (4) Date: Jun. 1, 2007

(87) PCT Pub. No.: WO2006/059501

PCT Pub. Date: Jun. 8, 2006

(65) Prior Publication Data

US 2008/0094128 A1      Apr. 24, 2008

(30) Foreign Application Priority Data

Dec. 3, 2004     (JP) ............................ 2004-350870

(51) Int. Cl.
G05F 1/10    (2006.01)
G05F 3/02    (2006.01)

(52) U.S. Cl. ........................... 327/536; 363/59; 363/60; 307/110

(58) Field of Classification Search ................ 327/536; 363/59

See application file for complete search history.

(56) References Cited

U.S. PATENT DOCUMENTS 5,561,385 A * 10/1996 Choi ........................... 327/536
6,930,535 B2 * 8/2005 Kim ........................... 327/536
2003/0227321 A1 * 12/2003 Kim et al. ................... 327/536
2005/0231127 A1 * 10/2005 Yamamoto et al. .......... 315/224

FOREIGN PATENT DOCUMENTS

| JP | 6-78527 | 3/1994 |
|---|---|---|
| JP | 10-312695 | 11/1998 |
| JP | 10-327575 A | 12/1998 |
| JP | 2002-40526 A | 2/2002 |
| JP | 2003-348821 | 12/2003 |

OTHER PUBLICATIONS

International Search Report for International Application No. PCT/JP2005/021242 mailed Dec. 13, 2005.

(Continued)

*Primary Examiner*—Lincoln Donovan
*Assistant Examiner*—John W Poos
(74) *Attorney, Agent, or Firm*—Cantor Colburn LLP

(57) ABSTRACT

A driver circuit for a charge pump circuit capable of switching between step-up ratios, may include a control unit which controls the charge pump circuit; a first oscillator outputting a first periodic signal; and a second oscillator outputting a second periodic signal employed for a time measurement for setting the step-up ratio and having a frequency set lower than the first periodic signal. When the step-up ratio of the charge pump circuit is larger than 1, the control unit turns on only the first oscillator to perform, based on the first periodic signal, a time measurement for setting the step-up ratio and the control of a step-up action of the charge pump circuit. When the step-up ratio of the charge pump circuit is 1, the control unit turns on only the second oscillator to perform the time measurement for setting up the step-up ratio based on the second periodic signal.

8 Claims, 5 Drawing Sheets

OTHER PUBLICATIONS

Written Opinion of The International Searching Authority for International Application No. PCT/JP2005/021242 with English translation.

Japanese Office Action for Japanese Patent Application No. 2006-547753 dated Feb. 10, 2009 with English Translation.

* cited by examiner

CHARGE PUMP CIRCUIT DRIVER CIRCUIT HAVING A PLURALITY OF OSCILLATORS

CROSS REFERENCE TO RELATED APPLICATIONS

This is a U.S. national stage of application No. PCT/JP2005/021242, filed on 18 Nov. 2005. Priority under 35 U.S.C. §119(a) and 35 U.S.C. §365(b) is claimed from Japanese Application No. 2004-350870, filed 3 Dec. 2004, the disclosure of which is also incorporated herein by reference.

BACKGROUND OF THE INVENTION

1. Field of the Invention

The present invention relates to a driver circuit for driving a charge pump circuit.

2. Description of the Related Art

Recent information terminals such as a cellular phone and a PDA (Personal Digital Assistance) are provided with light emitting diodes (hereinafter, referred to as LEDs) employed as, for example, a back light of a liquid crystal display. In such information terminals, a Li-ion battery is often employed, but the output voltage thereof is normally about 3.5 V and about 4.2 V at full charge. However, since a voltage of 4 V or higher is required to drive an LED, the battery voltage must be stepped up by use of a power unit such as a switching regulator in accordance with need to thereby supply the stepped up voltage to the LED.

A charge pump circuit capable of switching a step-up ratio as disclosed in Japanese Patent Laid-Open Publication No. Hei 6-78527 may be employed as a power unit for driving an LED. In this case, the step-up ratio is set to 1 if the voltage of a battery is sufficiently high, and is increased as the battery voltage decreases, thereby allowing the LED to be stably driven.

When the step-up ratio is set higher than 1 to perform a step-up action, a switching transistor must be switched on-off at a frequency of about 1 MHz for controlling charging and discharging of a capacitor of the charge pump circuit. A control circuit for the charge pump circuit has a built-in oscillator for this purpose. However, when the step-up ratio of the charge pump is set to 1, the step-up action is not performed. In this case, it is sufficient to bypass the input and output connectors of the charge pump circuit, and the switching transistor is not required to be switched on-off. Thus, if the 1 MHz oscillator is continuously operated, electric power is consumed unnecessarily.

SUMMARY OF THE INVENTION

The present invention has been made in view of such problems, and it is an object of the present invention to provide a charge pump circuit driver circuit having reduced electrical current consumption and improved efficiency.

One aspect of the present invention relates to a driver circuit for a charge pump circuit. This driver circuit is a driver circuit for a charge pump circuit capable of switching between a plurality of step-up ratios. The driver circuit comprises: a control unit which controls the charge pump circuit; a first oscillator which outputs a first periodic signal; and a second oscillator which outputs a second periodic signal employed for a time measurement and having a frequency set lower than that of the first periodic signal. When the step-up ratio of the charge pump circuit is larger than 1, the control unit turns on only the first oscillator to perform, based on the first periodic signal, the time measurement and the control of a step-up action of the charge pump circuit. On the other hand, when the step-up ratio of the charge pump circuit is 1, the control unit turns on only the second oscillator to perform the time measurement based on the second periodic signal.

In brief, the two oscillators having different oscillating frequencies are provided in the driver circuit for the charge pump circuit. When the step-up ratio is 1, the switching action for the charge pump circuit is unnecessary. In this case, the first oscillator is turned off, and only the second oscillator having a low frequency and provided for the time measurement is turned on. The lower the frequency of an oscillator, the lower the current consumption thereof. Therefore, according to this aspect, the current consumption when the step-up ratio is 1 can be reduced, thereby allowing efficiency to be improved.

The control unit may switch the step-up ratio of the charge pump circuit when the voltage to be monitored for switching the step-up ratio of the charge pump circuit satisfies predetermined conditions for a period of time equal to or longer than a predetermined period of time. The control unit may perform the time measurement at this time based on the first or second periodic signal.

When the step-up ratio is higher than 1, the time measurement for switching the step-up ratio is performed by use of the first periodic signal having a high frequency and employed for switching on-off a switching device of the charge pump circuit. When the step-up ratio is 1, the time measurement for switching the step-up ratio is performed by use of the second periodic signal having a low frequency. In this manner, the efficiency of the circuit can be improved.

The frequency of the second periodic signal may be set higher than a minimum frequency required for measuring the predetermined period of time in the control unit.

The second periodic signal may have a frequency which is determined in accordance with a period of time to be measured in the control unit and is the minimum required for this time measurement. In this manner, the current consumption of the second oscillator can be reduced, and the efficiency at a step-up ratio of 1 can be improved.

The frequency of the second periodic signal may be set equal to or less than one-tenth of the frequency of the first periodic signal. The first periodic signal is employed for switching on-off a switching device of the charge pump circuit. A period of time to be measured by use of the second periodic signal may be set shorter by one or more orders of magnitude than the period of the first periodic signal. In this manner, the frequency of the second oscillator can be set equal to or less than one-tenth of the frequency of the first oscillator. Therefore, the current consumption can be reduced when the step-up ratio is 1.

Another aspect of the present invention is a power unit. This power unit comprises a charge pump circuit capable of switching between a plurality of step-up ratios and the above-described driver circuit which drives the charge pump circuit.

In this case, the first and second oscillators are provided in the driver circuit, and only the second oscillator having a low frequency is turned on when the step-up ratio is 1. When the step-up ratio is 1, the switching action is not required to be performed in the charge pump circuit. In this manner, the efficiency of the power unit can be improved.

It is to be noted that any arbitrary combination or rearrangement of the above-described structural components and so forth are all effective as and encompassed by the present embodiments.

DETAILED DESCRIPTION OF THE INVENTION

Figure 1:
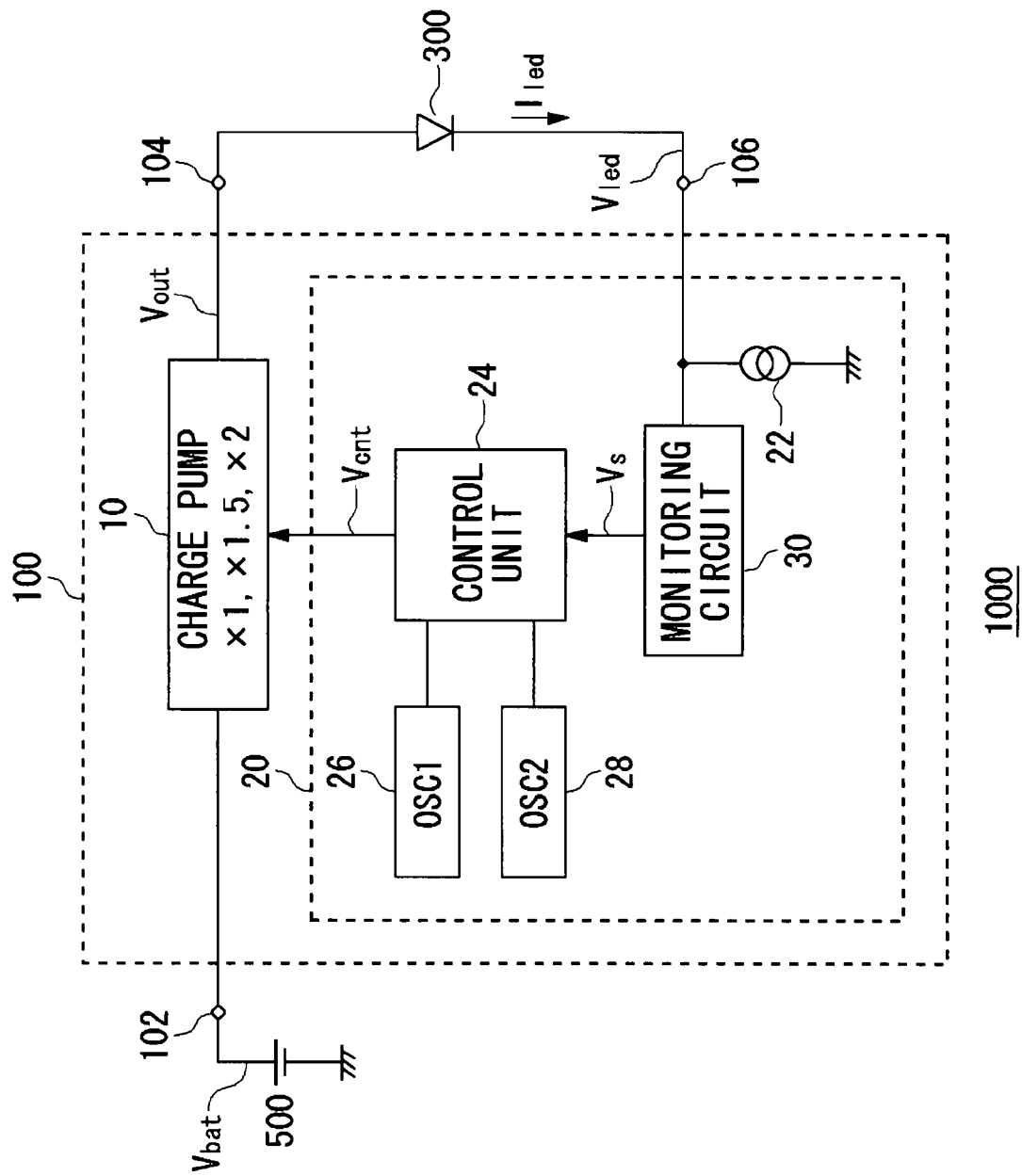
FIG. 1 is a block diagram showing the entire configuration of a driver circuit and a light emitting apparatus according to an embodiment of the present invention.

FIG. 1 shows a light emitting apparatus 1000 according to an embodiment of the present invention. This light emitting apparatus 1000 comprises a light emitting diode 300 serving as a light emitting device and a power unit 100 for driving the light emitting diode 300. The light emitting apparatus 1000 is mounted on an information terminal driven by a battery 500. The power unit 100 steps up the battery voltage Vbat output from the battery 500 to generate the voltage required for driving the light emitting diode 300. The light emitting apparatus 1000 is mounted on, for example, an electronic apparatus such as a cellular phone terminal or a PDA.

The power unit 100 comprises input-output terminals including an input terminal 102, an output terminal 104, and an LED terminal 106. The battery voltage Vbat is input to the input terminal 102. The output terminal 104 is connected to the anode terminal of the light emitting diode 300, and the output voltage Vout generated by stepping up the battery voltage Vbat is output thereto. The LED terminal 106 is connected to the cathode terminal of the light emitting diode 300.

The power unit 100 comprises a charge pump circuit 10 and a driver circuit 20 for the circuit 10. The charge pump circuit 10 steps up the battery voltage Vbat input from the input terminal 102 to generate the output voltage Vout to be output from the output terminal 104. The charge pump circuit 10 is configured so as to be capable of switching between a plurality of step-up ratios. In the present embodiment, the step-up ratio is switchable among three ratios including 1, 1.5, and 2.

Figure 2:
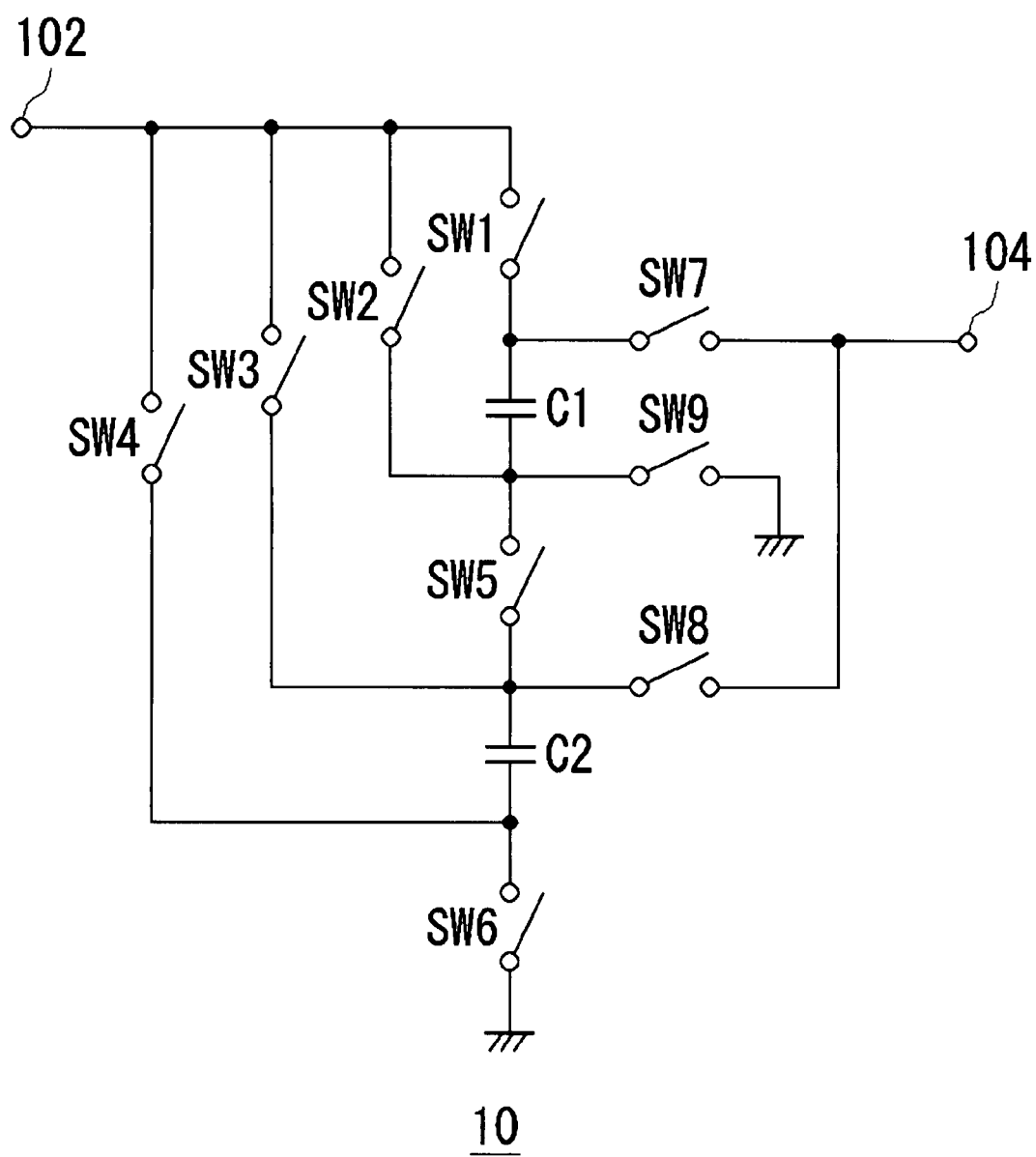
FIG. 2 is a circuit diagram showing the configuration of a charge pump circuit of FIG. 1.

FIG. 2 is a circuit diagram showing the configuration of the charge pump circuit 10. The charge pump circuit 10 comprises a first capacitor C1, a second capacitor C2, and first to ninth switches SW1 to SW9 for controlling a connection state of these capacitors. Hereinbelow, these switches are collectively referred to as a switch SW if the distinctions among them are unnecessary. The first and second capacitors C1 and C2 are set to have the same capacitance and are mounted outside the integrated circuit.

Each of the first to ninth switches SW1 to SW9 may be constituted by an N-type or P-type field effect transistor (FET) and may be operated as a switching device by changing the voltage applied to its gate terminal to control the drain-to-source conduction state. In this charge pump circuit 10, the on-off state of each of the first to ninth switches SW1 to SW9 is switched by use of a control signal Vcnt output from the driver circuit 20. The control signal Vcnt is input to each of the first to ninth switches SW1 to SW9 (not shown in FIG. 2).

As mentioned above, the charge pump circuit 10 is configured so as to be capable of switching between a plurality of step-up ratios. Next, the action of the charge pump circuit 10 will be described for each of the step-up ratios.

When the step-up ratio is set to 1, the first switch SW1, the third switch SW3, the seventh switch SW7, and the eighth switch SW8 are continuously switched on through the control signal Vcnt output from the driver circuit 20, and all the other switches are switched off. Therefore, since the input terminal 102 is electrically connected to the output terminal 104 through the on-state switches, the battery voltage Vbat applied to the input terminal 102 is output from the output terminal 104, allowing the step-up ratio to be set to 1.

Therefore, when the step-up ratio is set to 1, the control signal Vcnt output from the driver circuit 20 is not a switching signal which is periodically switched on and off but a constant voltage.

Next, the action when the step-up ratio is set to 1.5 will be described. When the step-up ratio is higher than 1, a step-up action is performed. In this case, a first period and a second period which have different connection states of the switch SW are repeated in the charge pump circuit 10.

In the first period, the first switch SW1, the fifth switch SW5, and the sixth switch SW6 are switched on, and all the other switches are switched off. In this manner, the first and second capacitors C1 and C2 are connected in series and charged to the battery voltage Vbat. Since the capacitances of the first and second capacitors C1 and C2 are the same, each of the capacitors is charged to Vbat/2 which is half of the battery voltage Vbat.

In the second period, the second and seventh switches SW2 and SW7 and the fourth and eighth switches SW4 and SW8 are switched on, and all the other switches are switched off. In this case, the first and second capacitors C1 and C2 are connected in parallel between the input terminal 102 and the output terminal 104. Therefore, the sum of the battery voltage Vbat applied to the input terminal 102 and the charged voltage of the capacitors is output from the output terminal 104. Since the first and second capacitors C1 and C2 are charged to a voltage of Vbat/2 in the first period, a resultant voltage of Vbat+Vbat/2=1.5×Vbat is output from the output terminal 104.

As such, by repeating the first and second periods, the charge pump circuit 10 multiplies the battery voltage Vbat by 1.5 to output the multiplied voltage therefrom.

Next, the action when the step-up ratio is set to 2 will be described.

In the first period, the first and ninth switches SW1 and SW9 and the third and sixth switches SW3 and SW6 are switched on, and all the other switches are switched off. The first and second capacitors C1 and C2 are then connected in parallel between the input terminal 102 and a grounding terminal GND, and each of the capacitors is charged to the battery voltage Vbat.

In the second period, the second and seventh switches SW2 and SW7 and the fourth and eighth switches SW4 and SW8 are switched on, and all the other switches are switched off. Therefore, the first and second capacitors C1 and C2 are connected in parallel between the input terminal 102 and the output terminal 104. The sum of the battery voltage Vbat applied to the input terminal 102 and the charged voltage of the capacitors is then output from the output terminal 104. Since each of the first and second capacitors C1 and C2 is charged to the battery voltage Vbat in the first period, a voltage of Vbat+Vbat=2×Vbat is output from the output terminal 104.

As such, by repeating the first and second periods, the charge pump circuit 10 multiplies the battery voltage Vbat by 2 to output the multiplied voltage therefrom.

Returning to FIG. 1, the driver circuit 20 sets the step-up ratio of the charge pump circuit 10 and controls the step-up action or the connection state of the switch SW of the charge pump circuit 10. This driver circuit 20 comprises a constant current circuit 22, a control unit 24, a first oscillator 26, a second oscillator 28, and a monitoring circuit 30.

The constant current circuit 22 is connected to the cathode terminal of the light emitting diode 300 via an LED terminal 106. The luminance of the light emitting diode 300 is determined by an electric current Iled passing through the light emitting diode 300. Thus, the constant current circuit 22 controls the current Iled such that the luminance of the light emitting diode 300 is maintained at a predetermined value.

The monitoring circuit 30 monitors the voltage across the constant current circuit 22 which voltage serves as a voltage to be monitored for switching the step-up ratio of the charge pump circuit 10. The monitoring circuit 30 compares the voltage across the constant current circuit 22 with a predetermined voltage and outputs the comparison results to the control unit 24. In the present embodiment, the voltage across the constant current circuit 22 corresponds to the voltage between the grounding terminal and the LED terminal 106. The control unit 24 switches the step-up ratio of the charge pump circuit 10 based on the output from the monitoring circuit 30, and the details will be described later.

Figure 3:
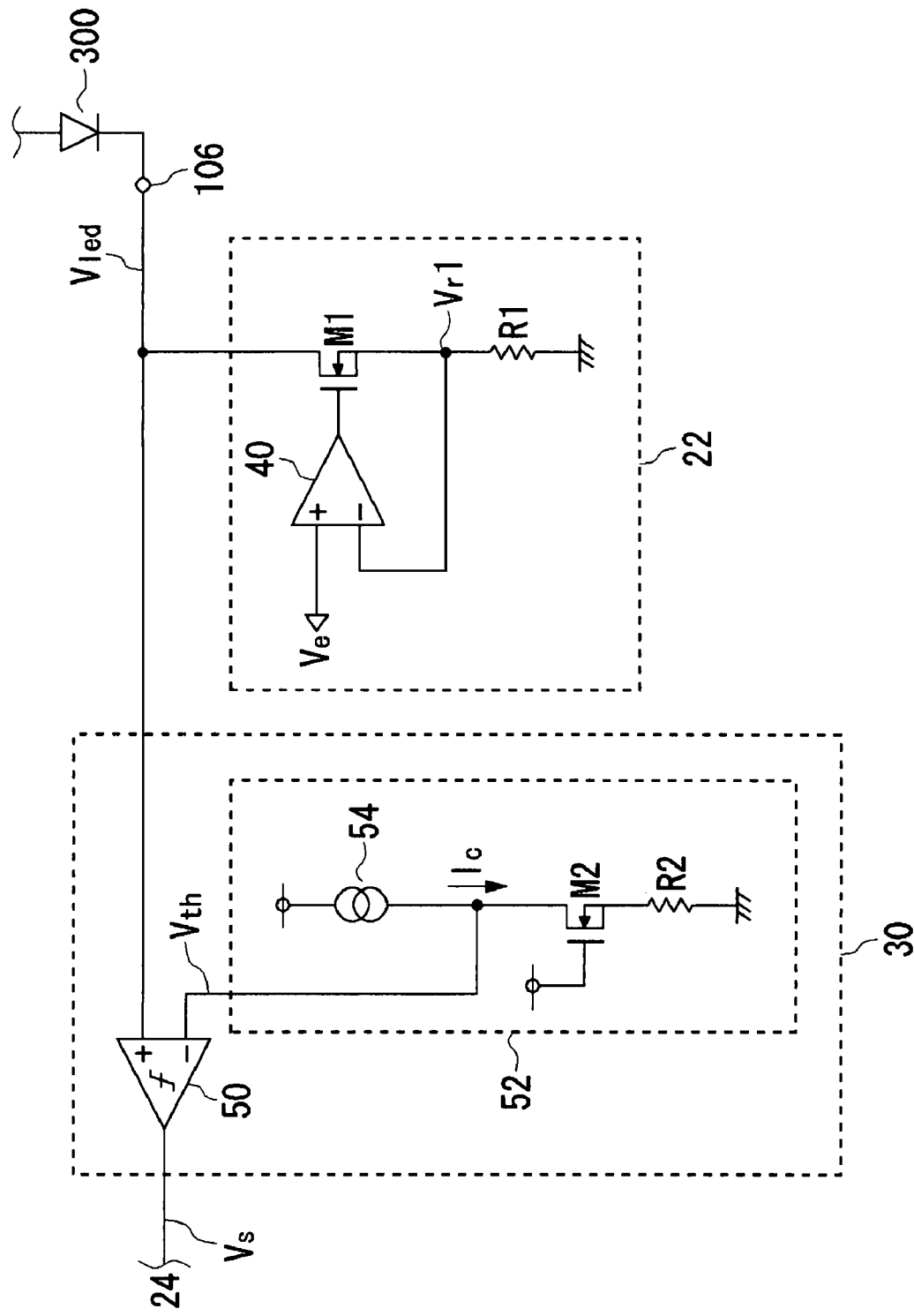
FIG. 3 is a circuit diagram showing the configuration of a constant current circuit and a monitoring circuit of FIG. 1.

FIG. 3 is a circuit diagram showing the configuration of the constant current circuit 22 and the monitoring circuit 30.

The constant current circuit 22 comprises a first transistor M1, a first resistor R1, and a first operational amplifier 40. The first transistor M1 is an N-type MOSFET (Metal Oxide Semiconductor Field Effect Transistor). The first transistor M1 and the first resistor R1 are provided in series in the flow path of the constant current. The inverting input terminal of the first operational amplifier 40 is connected to the junction point between the first transistor M1 and the first resistor R1, and a voltage Vr1 is fed back to the inverting input terminal. Also, a luminance control voltage Ve for specifying the luminance of the light emitting diode 300 is applied to the non-inverting input terminal. Further, the output terminal of the first operational amplifier 40 is connected to the gate terminal of the first transistor M1 which terminal serves as a control terminal.

The voltage Vr1 applied to the first resistor R1 is fed back to the inverting input terminal of the first operational amplifier 40. In this case, feedback is provided such that the voltages of the inverting input terminal and the non-inverting input terminal become the same. Thus, the voltage applied to the first resistor R1 approaches the luminance control voltage Ve.

When the voltage Vr1 applied to the first resistor R1 is equal to the luminance control voltage Ve, a current I=Ve/R1 passes through the first resistor R1. This current I is nothing but the current Iled passing from the light emitting diode 300 via the first transistor M1 and the LED terminal 106.

In this manner, the constant current circuit 22 generates the constant current Iled=Ve/R1 based on the luminance control voltage Ve and controls the current Iled passing through the light emitting diode 300.

In order for the constant current circuit 22 to generate the current stably, the first transistor M1 must be operated in a constant current region. The constant current region refers to a saturation region when the transistor is a field effect transistor (FET) and to an active region when the transistor is a bipolar transistor.

When the voltage Vled at the LED terminal 106 decreases, the potential difference across the first transistor M1 or the drain-to-source voltage thereof decreases, thereby causing the first transistor M1 to be operated in a non-saturation region. In the non-saturation region, the current passing between the drain and the source depends on the drain-to-source voltage, and thus the constant current circuit 22 does not operate as a constant current circuit. Therefore, the luminance of the light emitting diode 300 cannot be stabilized.

Hence, as shown in FIG. 3, the monitoring circuit 30 monitors the voltage Vled at the LED terminal 106 so as to prevent the voltage Vled from falling below a predetermined threshold voltage Vth. This threshold voltage Vth is set within the range where the first transistor M1 is operated in the constant current region (saturation region).

The monitoring circuit 30 comprises a voltage comparator 50 and a voltage source 52 which outputs the threshold voltage Vth. The voltage Vled at the LED terminal 106 and the threshold voltage Vth are input to the voltage comparator 50. The voltage comparator 50 outputs a high level if Vled>Vth and a low level if Vled<Vth. An output Vs of the voltage comparator 50 is input to the control unit 24.

When the state in which the voltage Vs output from the monitoring circuit 30 is at the low level (i.e., Vled<Vth) continues for a predetermined period of time, the control unit 24 increases the step-up ratio of the charge pump circuit by one level. Specifically, when the voltage Vs output from the monitoring circuit 30 becomes the low level during the operation at a step-up ratio of 1, the control unit 24 sets the step-up ratio to 1.5. Similarly, when the voltage Vs output from the monitoring circuit 30 becomes the low level during the operation at a step-up ratio of 1.5, the control unit 24 sets the step-up ratio to 2.

Therefore, if the battery voltage Vbat decreases due to the discharge of the battery 500 to thereby cause the voltage Vled at the cathode terminal of the light emitting diode 300 to decrease, the step-up ratio can be appropriately switched. If the step-up ratio is set to a higher value, the output voltage Vout output from the output terminal 104 increases. Thus, the voltage Vled at the LED terminal 106 can be set higher than the threshold voltage Vth, thereby allowing the constant current circuit 22 to be stably operated.

The threshold voltage Vth output from the voltage source 52 is set to a voltage at which the constant current circuit 22 can be operated stably. That is, the threshold voltage Vth is set within the range where the first transistor M1 is operated in the constant current region (saturation region). For example, the threshold voltage Vth is set to 0.3 V.

Figure 4:
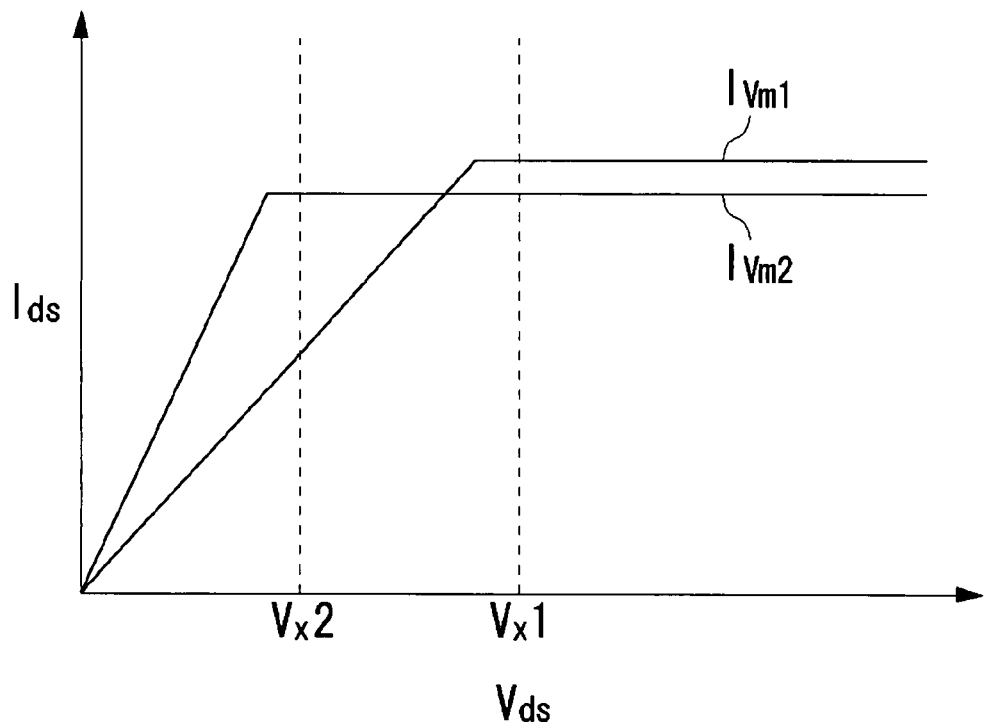
FIG. 4 is a graph showing the current-voltage characteristics of an FET serving as a first transistor.

The circuit characteristics and the device characteristics of the first transistor M1, the first resistor R1, and the first operational amplifier 40 which constitute the constant current circuit 22 are changed due to temperature or variations in the semiconductor manufacturing process. FIG. 4 is a graph showing the current-voltage characteristics (I-V characteristics) of an FET serving as the first transistor M1. The vertical axis represents a drain-to-source current Ids, and the horizontal axis represents a drain-to-source voltage Vds.

In FIG. 4, in a normal current-voltage characteristics curve Ivm1, the saturation region is a region where the drain-to-source voltage is higher than a voltage Vx1, and the non-saturation range is a region where the drain-to-source voltage is lower than the voltage Vx1. Assuming that the current-voltage characteristics IV are changed to current-voltage characteristics IVm2 due to variations in the semiconductor manufacturing process or temperature changes, this causes the boundary voltage between the saturation region and the non-saturation region to be shifted to Vx2.

The voltage across the constant current circuit 22 is the sum of the voltage drop Vr1 at the first resistor R1 and the drain-to-source voltage of the first transistor M1. Therefore, the voltage required to stably operate the constant current circuit 22 is changed along with the change of the current-voltage characteristics of the first transistor M1. Similarly, the required voltage is also changed due to variations of the resistance value of the first resistor R1.

The current-voltage characteristics IVm of the first transistor M1 may fluctuate between IVm1 and IVm2 in FIG. 4 due to variations in the semiconductor manufacturing process or temperature changes. In such a case, the voltage for stably operating the constant current circuit 22 varies in the range from Vth2=Ic×R1+Vx2 to Vth1=Ic×R1+Vx1.

If a constant value is employed for the threshold voltage Vth generated by the voltage source 52 of the monitoring circuit 30, the threshold voltage Vth is required to be set to Vth1=Ic×R1+Vx1 by taking into consideration a margin. This threshold voltage Vth1 is required to stably operate the constant current circuit 22 in the entire range where the current-voltage characteristics of the first transistor M1 vary.

Figure 5:
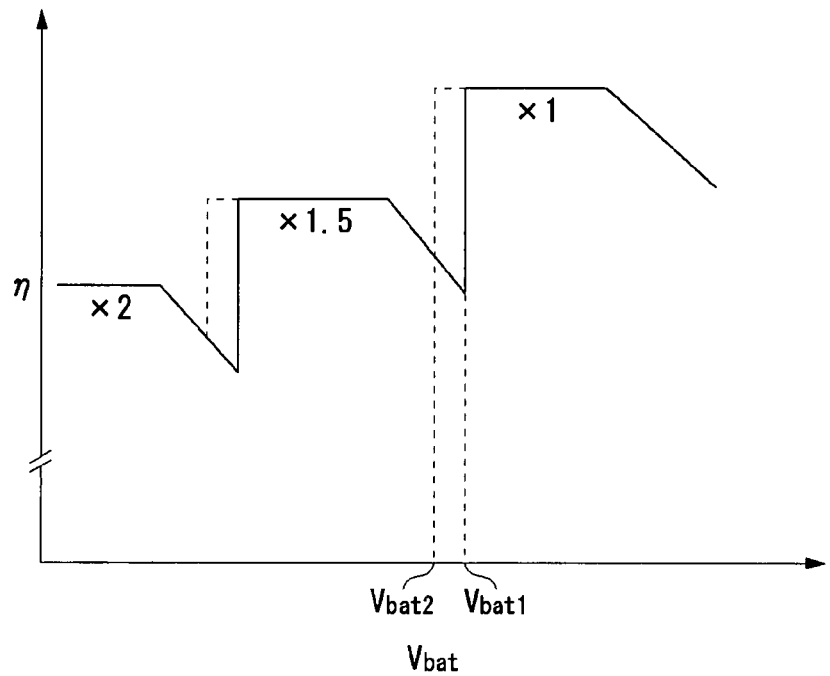
FIG. 5 is a graph showing the relationship between the input voltage of the charge pump circuit and efficiency.
Figure 6:
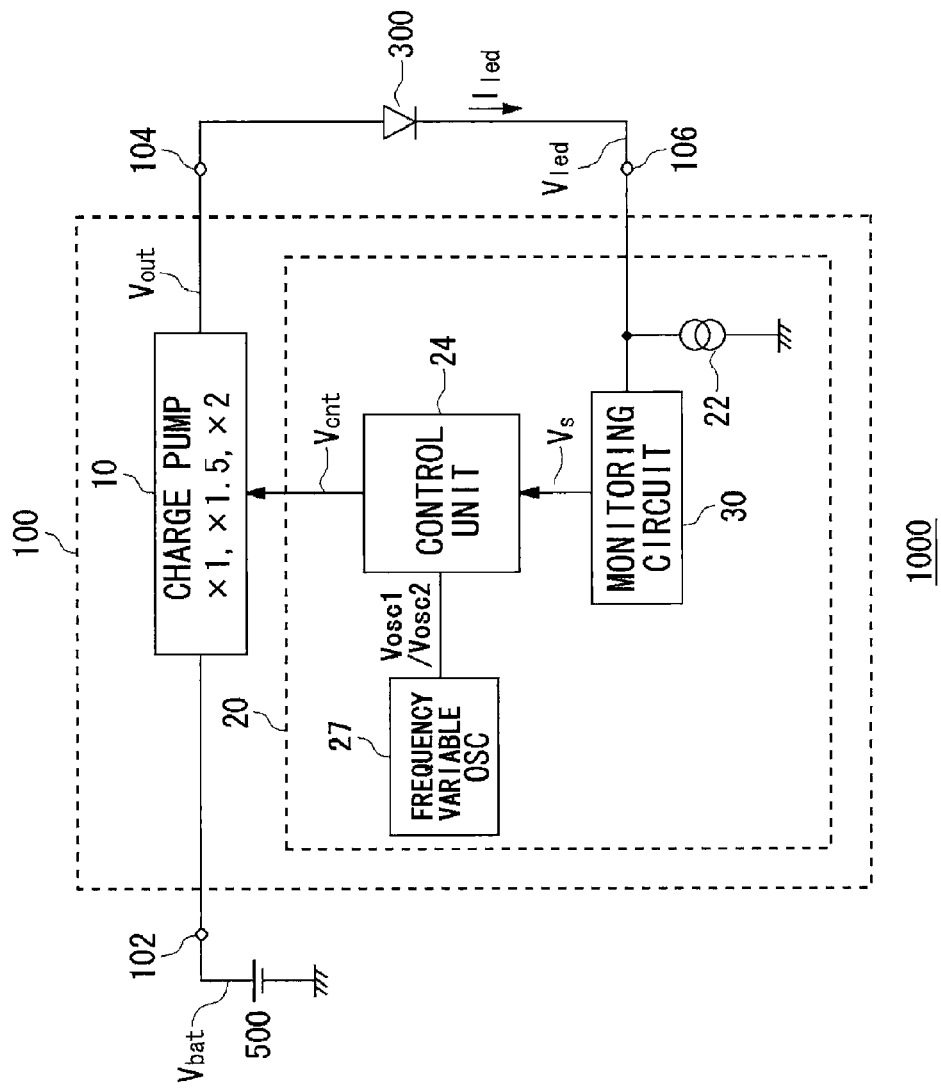
FIG. 6 is a block diagram showing a configuration of a driver circuit and a light emitting apparatus according to at least an embodiment.

Next, the efficiency of the charge pump circuit 10 will be considered. FIG. 5 is a graph showing the relationship between the battery voltage Vbat serving as the input voltage of the charge pump circuit 10 and the efficiency η.

Here, the case will be considered in which the threshold voltage Vth generated by the voltage source 52 is fixed to the voltage Vth1. When the step-up ratio is 1, the relationship between the battery voltage Vbat and the voltage Vled at the LED terminal 106 is expressed by the following equation using a forward voltage Vf of the light emitting diode 300: Vbat=Vled+Vf. As the battery voltage Vbat decreases, Vbat falls below Vbat1 (=Vth1+Vf). At this time, the voltage Vled at the LED terminal 106 falls below Vth1, and thus the step-up ratio is switched from 1 to 1.5.

In the above case, the threshold voltage Vth is fixed to the voltage Vth1. If the characteristics of the first transistor M1 are varied, the voltage for stably operating the constant current circuit 22 may become lower than the fixed threshold voltage Vth1. Even in this case, the step-up ratio is switched to 1.5 when Vbat falls below Vbat1. Therefore, there still remains room for improving the efficiency.

Hence, in order to improve the efficiency of the charge pump circuit 10, the voltage source 52 of the monitoring circuit 30 according to the present embodiment is configured so as to generate the threshold voltage Vth which follows the characteristics fluctuation of the first transistor M1 and the first resistor R1.

Returning to FIG. 3, the voltage source 52 comprises a second transistor M2, a second resistor R2, and a current source 54.

The second transistor M2, the second resistor R2, and the current source 54 are connected in series, and the second transistor M2 and the second resistor R2 receive a constant current Ic generated by the current source 54.

The voltage source 52 outputs the voltage at the junction point between the second transistor M2 and the current source 54 as the threshold voltage Vth. The drain-to-source voltage Vds2 of the second transistor M2 is determined by the constant current Ic, and the voltage Vr2 present across the second resistor R2 is given by Vr2=Ic×R2. Therefore, the threshold voltage Vth can be expressed by Vth=Ic×R2+Vds2.

As such, the voltage source 52 has the configuration of the main part for generating the threshold voltage Vth nearly the same as that of the constant current circuit 22. Preferably, it is desirable that the first and second resistors R1 and R2 be formed as a pair in close proximity to each other on a semiconductor integrated circuit. Similarly, it is desirable that the first and second transistors M1 and M2 be formed as a pair in close proximity to each other.

As described above, the voltage source 52 has the configuration of the main part the same as that of the constant current circuit 22. Thus, by forming the resistors and the transistors constituting the circuit as respective pairs, the fluctuation amounts of the characteristics of the devices in correspondence with each other can come very close to each other.

Therefore, if the current-voltage characteristics of the first transistor M1 are varied to cause the boundary voltage Vx between the saturation and non-saturation regions to be changed, the boundary voltage Vx between the saturation and non-saturation regions of the second transistor M2 is also changed. Thus, the threshold voltage Vth can be changed so as to follow the characteristics changes of the first transistor M1.

Similarly, the resistors may be formed such that, if the resistance value of the first resistor R1 is changed due to variations in the semiconductor manufacturing process or temperature changes, the resistance value of the second resistor R2 is similarly changed. In this manner, the threshold voltage Vth also follows the characteristics changes of the second resistor R2.

The voltage required to stably operate the constant current circuit 22 may be changed by the fluctuation of the device characteristics due to variations in the process or temperature changes. Even in such a case, by configuring the monitoring circuit 30 as described above, the threshold voltage Vth is generated in accordance with the above voltage change. Therefore, the optimal step-up ratio can be set in the control unit 24.

This means that the voltage for switching the step-up ratio can be appropriately set within the range from Vbat2 to Vbat1, as shown in FIG. 5, and thus the efficiency of the charge pump circuit 10 can be improved. Similarly, the step-up ratio can be switched from 1.5 to 2 at the optimal voltage, thus the efficiency can also be improved.

Returning to FIG. 1, the control unit 24 sets the step-up ratio of the charge pump circuit 10 and generates the control signal Vcnt corresponding to the set-step-up ratio. This control unit 24 monitors the output signal Vs of the monitoring circuit 30 and increases the step-up ratio when the low level state of the output signal Vs continues for a predetermined period of time. In the present embodiment, the control unit 24 increases the step-up ratio of the charge pump circuit 10 by one level when the output signal Vs of the monitoring circuit 30 is held at the low level for 2 ms.

A periodic signal required for the control unit 24 to generate the control signal Vcnt and to perform a time measurement is output from the first oscillator 26 or the second oscillator 28. Each of the first and second oscillators 26 and 28 is provided with an enable terminal (not shown) and is configured so as to be capable of suspending the action.

The control unit 24 generates the control signal Vcnt when the step-up action is performed in the charge pump circuit 10 (i.e., when the step-up ratio is set to 1.5 or 2). The control signal Vcnt serves as a switching signal for switching on-off the first to ninth switches Sw1 to SW9. The first oscillator 26 generates a first periodic signal Vosc1 having a frequency required for this switching signal. For example, the frequency of the first periodic signal Vosc1 is set to 1 MHz.

Moreover, the control unit 24 generates a second periodic signal Vosc2 having a frequency required for measuring a period of time of 2 ms employed when the output signal Vs of the monitoring circuit 30 is monitored. Since a period of time of about 2 ms can be measured by use of a frequency of about several tens of kHz, the frequency of the second periodic signal Vosc2 is assumed to be set to 64 kHz in the present embodiment.

The driver circuit 20 employs one of the first oscillator 26 and the second oscillator 28 by switching the oscillators in accordance with the step-up ratio of the charge pump circuit 10. Hence, the control unit 24 sends an enable signal for controlling an on-off state to the enable terminal of each of the first and second oscillators 26 and 28 in accordance with the step-up ratio of the charge pump circuit 10.

The action in the driver circuit 20 when the step-up ratio of the charge pump circuit 10 is switched will next be described.

If the battery voltage Vbat output from the battery 500 is sufficiently high, the step-up ratio is set to 1. As the battery voltage Vbat decreases due to power consumption, the voltage Vled at the LED terminal 106 also decreases. The monitoring circuit 30 compares the threshold voltage Vth output from the voltage source 52 with the voltage Vled at the LED terminal 106 and outputs the low level serving as the output signal Vs when Vled falls below Vth.

For setting the step-up ratio of the charge pump circuit 10 to 1, the first, third, seventh, and eighth switches SW1, SW3, SW7, and SW8 are continuously switched on in the charge pump circuit 10. Thus, the first periodic signal Vosc1 having a frequency of 1 MHz is not required. Therefore, when the step-up ratio is 1, the control unit 24 turns off the first oscillator 26 and operates only the second oscillator 28 to perform the time measurement by use of the second periodic signal Vosc2.

When the output signal Vs of the monitoring circuit 30 assumes the low level for 2 ms, the control unit 24 switches the step-up ratio to 1.5. If the step-up ratio is higher than 1, a switching signal which is periodically switched on and off must be generated and serves as the control signal Vcnt to be output to the charge pump circuit 10 as described above. At this time, since the first periodic signal Vosc1 is required in the control unit 24, the first oscillator 26 is turned on. If the step-up ratio is 1.5, the control unit 24 performs the time measurement for monitoring the state of the output signal Vs of the monitoring circuit 30 by use of the first periodic signal Vosc1. In this case, since the second periodic signal Vosc2 is not required, the control unit 24 turns off the second oscillator 28.

If the battery voltage Vbat further decreases, the step-up ratio is set to 2. Also in this case, the control unit 24 turns on only the first oscillator 26. Further, based on the first periodic signal Vosc1, the control unit 24 generates the control signal Vcnt and performs the 2 ms-time measurement.

The current consumption of the oscillators depends on a frequency. That is, the higher the frequency, the larger the current consumption. Therefore, the current consumption of the first oscillator 26 is larger than that of the second oscillator 28. Hence, in the driver circuit 20 according to the present embodiment, when the step-up action is performed, the first oscillator 26 oscillating at 1 MHz is turned on to generate the control signal Vcnt and to perform the time measurement for setting the step-up ratio. On the other hand, when the step-up ratio is 1, a high frequency signal is not required to be generated as the control signal Vcnt. Therefore, by switching to the second oscillator 28 having a lower current consumption, the current consumption of the circuit can be reduced to improved the efficiency.

As above, the configuration and the action of the power unit 100 according to the present embodiment has been described.

In the power unit 100 according to the present embodiment, the control signal for controlling the charge pump action is required to be generated, and also the time measurement is required to be preformed. In this case, the driver circuit of the charge pump circuit is provided with the two oscillators oscillating at different frequencies. When the step-up ratio is 1, the high frequency oscillator having a large current consumption is turned off, and the low frequency oscillator required for the time measurement is employed. In this manner, the current consumption when the step-up ratio is 1 can be reduced, and the power conversion efficiency can be improved at light load where the output current passing through the load circuit is small.

The above embodiment is for illustrative purpose only. It will be understood by a person skilled in the art that various modifications may be made to combinations of the foregoing components and processes, and all such modifications fall within the scope of the present invention.

In the embodiment, the description has been made for the case where the first and second oscillators 26 and 28 are separately configured. However, these oscillators may be integrally formed as a single oscillator 27 in which the frequency can be switched between those for the first and second periodic signals as shown in FIG. 5. Also in this case, by switching the frequency of the oscillator in accordance with the step-up ratio of the charge pump circuit 10, similar effects as described in the embodiment can be obtained. Moreover, by integrally forming the two oscillators, the circuit area can be reduced.

The present invention is widely applicable to the driver circuit of the charge pump circuit 10 capable of switching the step-up ratio.

For example, in the present embodiment, the description has been made for the case where the light emitting diode 300 serving as a load circuit is driven by the charge pump circuit 10 of the power unit 100, but the present invention is not limited thereto. The present invention is also applicable to other power units driving another load circuit. In this case, the load circuit is not necessarily driven by a constant current as in the light emitting diode 300.

The step-up ratio may be set based on the battery voltage Vbat serving as the input voltage of the charge pump circuit 10 or the output voltage Vout of the charge pump circuit 10. In this case, the monitoring circuit 30 monitors the battery voltage Vbat or the output voltage Vout as the voltage to be monitored in order to switch the step-up ratio of the charge pump circuit 10. Also, the control unit 24 switches the step-up ratio of the charge pump circuit 10 when the battery voltage Vbat or the output voltage Vout falls below a predetermined voltage for a predetermined period of time.

In the present embodiment, the transistor employed is an FET, but another type of transistor such as a bipolar transistor may be employed. The selection may be made in accordance with the design specifications required for the power unit, the semiconductor manufacturing process employed, or the like.

In the present embodiment, all the devices constituting the power unit may be integrally formed, or a part thereof may be constituted as a discrete component. The components to be integrated may be determined based on the cost or the occupied area thereof.

What is claimed is:

1. A driver circuit for a charge pump circuit capable of switching between a plurality of step-up ratios, including 1 and a value higher than 1, comprising:

a control unit which controls the charge pump circuit;

a first oscillator which outputs a first periodic signal; and a second oscillator which outputs a second periodic signal employed for a time measurement for setting the step-up ratio and having a frequency set lower than that of the first periodic signal, and wherein, when the step-up ratio of the charge pump circuit is larger than 1, the control unit turns on only the first oscillator to perform, based on the first periodic signal, a time measurement for setting the step-up ratio and the control of a step-up action of the charge pump circuit, and wherein, when the step-up ratio of the charge pump circuit is 1, the control unit turns on only the second oscillator to perform the time measurement for setting the step-up ratio based on the second periodic signal;

wherein the control unit switches the step-up ratio of the charge pump circuit when the voltage to be monitored for switching the step-up ratio of the charge pump circuit satisfies a predetermined condition for a period of time equal to or longer than a predetermined period of time, and the control unit performs the time measurement for setting the step-up ratio at this time based on the first or second periodic signal; and wherein the frequency of the second periodic signal is set higher than a minimum frequency required for measuring the predetermined period of time in the control unit.

2. The driver circuit according to claim 1, being integrally formed on a single semiconductor substrate.

3. A power unit comprising:
a charge pump circuit capable of switching between a plurality of step-up ratios; and
the driver circuit according to claim 1 which drives the charge pump circuit.

4. A light emitting apparatus, comprising:
a light emitting diode;
a battery; and
the power unit according to claim 3 which steps up a voltage of the battery to drive the light emitting diode.

5. A driver circuit for a charge pump circuit capable of switching between a plurality of step-up ratios including 1 and a value higher than 1, comprising:

a control unit which controls the charge pump circuit; and
an oscillator which outputs either a first periodic signal or a second periodic signal having a frequency set lower than that of said first periodic signal in a switching manner, and wherein, when the step-up ratio of the charge pump circuit is higher than 1, the control unit performs, based on the first periodic signal, the control of a step-up action of the charge pump circuit and a time measurement for setting the step-up ratio and wherein, when the step-up ratio of the charge pump circuit is 1, the control unit performs the time measurement for setting the step-up ratio based on the second periodic signal;

wherein the control unit switches the step-up ratio of the charge pump circuit when the voltage to be monitored for switching the step-up ratio of the charge pump circuit satisfies a predetermined condition for a period of time equal to or longer than a predetermined period of time, and the control unit performs the time measurement for setting the step-up ratio at this time based on the first or second periodic signal; and wherein the frequency of the second periodic signal is set higher than a minimum frequency required for measuring the predetermined period of time in the control unit.

6. The driver circuit according to claim 5, being integrally formed on a single semiconductor substrate.

7. A power unit comprising:
a charge pump circuit capable of switching between a plurality of step-up ratios; and
the driver circuit according to claim 5 which drives the charge pump circuit.

8. A light emitting apparatus, comprising:
a light emitting diode;
a battery; and
the power unit according to claim 7 which steps up a voltage of the battery to drive the light emitting diode.

* * * * *